Aug. 26, 1952     F. E. ROBERT     2,608,430
PROTECTIVE DEVICE FOR BUMPERS AND BUMPER GUARDS
Filed Dec. 31, 1949
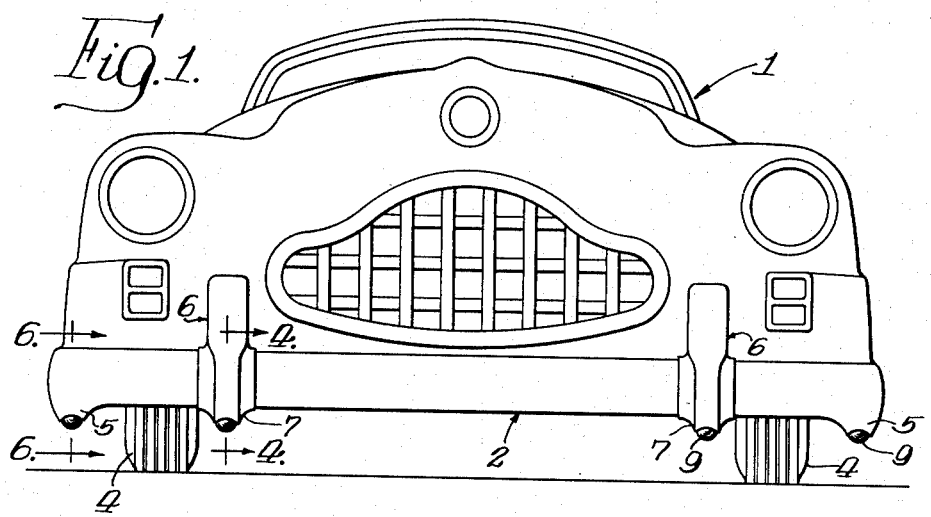
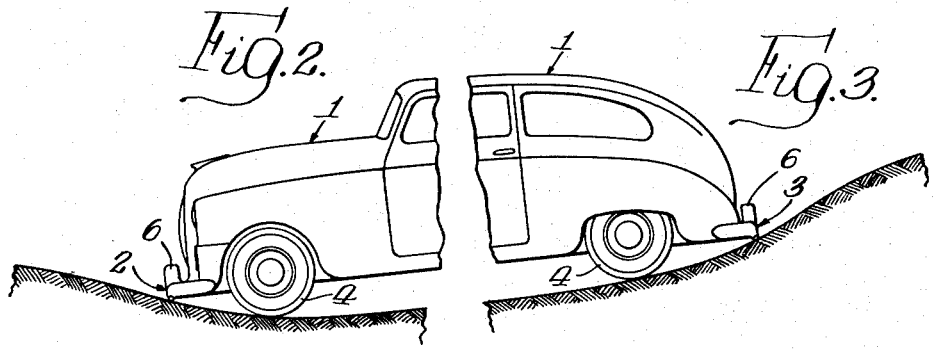
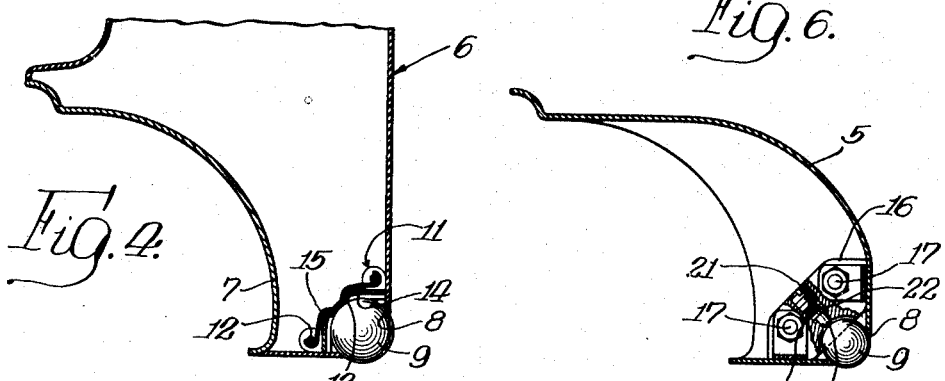
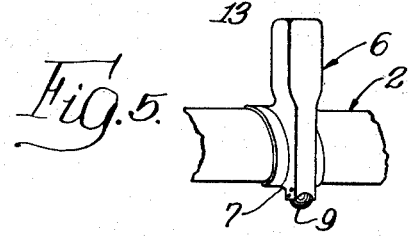
INVENTOR.
Florent E. Robert,
BY Wilson Geppel
Attys Patented Aug. 26, 1952

2,608,430

UNITED STATES PATENT OFFICE 2,608,430

PROTECTIVE DEVICE FOR BUMPERS AND BUMPER GUARDS

Florent E. Robert, Chicago, Ill.

Application December 31, 1949, Serial No. 136,255

3 Claims. (Cl. 293—67)

The present invention relates to a novel bumper and bumper guard attachment providing a protective device adapted to contact the road surface and prevent the depending forward ends of the bumpers or bumper guards from scraping or digging into the road surface.

In modern designs of automobiles, considerable emphasis is placed on mounting the chassis and body low whereby there is but little clearance between the body and the road, and with the body extending forwardly of and rearward from the wheels a considerable distance and thereat provided with bumpers having vertical projections or bumper guards, it happens that when the automobile is driven across a depression or up or down an incline that the projecting ends of the bumper guards or projections at either the front or rear of the automobile may strike the road surface or pavement. As these guards or projections are rigidly mounted on the bumpers and the latter rigidly mounted on the chassis, should one of them scrape or engage the road surface when the automobile is in motion, it will be readily appreciated that damage to the bumper guard or bumper will result, and such engagement might even cause the operator to lose control with resulting damage to the automobile and perhaps injury to the occupants.

It is therefore, an important object of the present invention to provide the bumper guards or depending portions of the bumpers with rollers or rolling surfaces which contact or engage the road surface and lift the vehicle chassis, whereby to prevent the bumper or bumper guard from scraping or digging into the incline when the automobile is travelling in a forward or reverse direction.

The present invention is applicable to the forward depending ends of bumper guards mounted at spaced locations on the front and rear bumpers, as well as to the lower ends of depending projections which may be formed integral with the bumper, whereby to protect the bumper and bumper guards against scraping or digging into the road surface.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in front elevation of a current model or style of automobile in which the bumper is provided with depending ends and intermediate bumper guards each equipped with the present invention of protecting device.

Fig. 2 is a fragmentary view of the front of an automobile in which the depending forward ends of the front bumper guards are in contact with an upwardly inclined surface of the roadway.

Fig. 3 is a fragmentary view of the rear of the automobile in which the depending ends of the rear bumper or bumper guards are in contact with a downwardly inclined surface of the roadbed.

Fig. 4 is a fragmentary enlarged view in vertical cross-section through the depending end of the bumper guard and taken in a plane represented by the line 4—4 of Fig. 1.

Fig. 5 is a view in perspective of the front of the bumper guard provided with the novel protective device.

Fig. 6 is an enlarged view in vertical cross-section through the depending end of the bumper taken in a plane represented by the line 6—6 of Fig. 1 but showing an alternate form of ball retainer.

Referring to the disclosure in the drawing and more particularly to the novel illustrative embodiment, there is disclosed an automobile 1 of modern design having a front bumper 2 and a rear bumper 3 each spaced a substantial distance from the wheels 4. The illustrative form of bumper shown in Fig. 1 is provided at its opposite ends with a depending projection 5 and intermediate these ends with a pair of spaced uprights or bumper guards 6 fixedly mounted upon the bumper and each having its lower end 7 depending below and forwardly of the lower edge of the bumper.

As the body of the automobile and the bumpers 3 and 2 and bumper guards 6 are disposed rather low at the front and rear of the automobile, if the automobile is driven across a gutter or gulley or up or down a relatively sharp incline where the road surface inclines sufficient to form an angle greater than the angle normally formed between the depending ends of the bumpers or guards and the adjacent wheels, the depending ends of the bumper guards or the depending ends of the bumper will scrape or strike the road surface or pavement. Even if the automobile is being driven at a relatively slow speed, this scraping or engagement may be sufficient to cause damage or bucking of the guards and sometimes the entire bumper is bent. Of course, if the automobile is travelling at a faster rate of speed, such scraping or digging into the road surface could cause the operator to lose control of the automobile with the resulting damage to the automobile and possibly injury to the occupants.

To obviate any danger of such scraping or engagement with the road surface, the present invention provides for a protective device having a free rolling surface at the extreme ends of the depending projections where such ends would engage the road surface. It comprises providing an opening 8 in the depending forwardly extending ends or projections 5 of the front bumper 2 and at the depending rearwardly extending ends of the rear bumper 3 and in the similarly disposed depending ends 7 of the bumper guards 6, and positioning a free rolling ball or spherical roller 9 therein. This ball or spherical member may be of metal or other material suitable for the purpose and is retained in operative position therein with a portion of the surface of this ball or roller projecting through and beyond the confines of the opening 8. This opening is preferably of such size that approximately one-third the spherical surface of the ball or spherical roller extends through the opening and to the exterior thereof.

To maintain this ball or spherical member in its operative position within the bumper or bumper guard, there is provided a retainer 11 securely anchored and retained in place in the bumper guard or bumper by screws or other fastening means 12, and provided with a slot 13 in its spherical or arcuate surface 14 through which projects a spring or spring-pressed detent 15 for holding the spherical or rolling member against rattling.

Fig. 6 discloses a similar ball or spherical roller but a modified form of ball retainer 16 secured in position in the bumper or bumper guard by means of screws or other fastening means 17. The ball or spherical member 9 is spring-pressed to its outer or extended position by means of a plunger or detent 18 against which seats an expansion or coil spring 19 held between the detent and an adjusting screw 21 adjustably mounted in the threaded end of a bore 22 in the retainer 16. By this construction, the spring pressure applied to the ball or roller may be adjusted, as required, to prevent it from rattling.

The present invention is adapted for mounting on the projecting ends of either a bumper or a bumper guard and when assembled provides a free rolling spherical surface which contacts or abuts the road surface whenever the forward or rear end of the car is tilted or inclined at an angle with respect to the road surface sufficient to cause the bumper or bumper guards to contact therewith were they not equipped with the present protective device.

Having thus disclosed the invention, I claim:

1. A device for preventing the depending projections of the bumpers and bumper guards of an automobile from scraping or digging into an inclined surface of a roadway, comprising a spherical member mounted for free rotation in an aperture opening downwardly in the lower end of a projection depending below the body of the bumper and upon contact with the roadway said member lifts the chassis of the automobile, said aperture being of a size sufficient to allow a portion only of said member to project downwardly therethrough and beyond the lower end of the projection but less than the diameter of said member whereby to prevent the latter from becoming disengaged, and a cupped retainer in the projection for maintaining the spherical member in operative position and provided with tension means for retaining said member under tension.

2. A protective device for the depending ends of the bumpers or bumper guards of a power driven vehicle for preventing these ends which extend below the remainder of the bumpers or bumper guards from engaging the surface of the road when the vehicle passes over an inclination or depression, comprising a spherical and freely rotatable roller disposed in the lower and forward depending end with a portion of the spherical surface of the roller projecting downwardly through an opening in and beyond the depending end whereby said roller is in position to engage the road surface when the vehicle passes over an inclination of such angularity as would normally cause said depending end to engage the road surface and upon contact with the road surface said roller lifts the chassis of the vehicle, and retaining means within the depending end urging the roller into and partially through the opening and retaining the roller under tension.

3. In combination with the depending portion of a bumper for a power driven vehicle for preventing this depending portion from digging into or scraping against the inclined surface of a road or driveway when the vehicle passes thereover, a spherical member mounted for free rotation in an opening in the lower edge of the depending portion with a portion of said member projecting downwardly and beneath the lower end of said depending portion for engaging the road surface only when the vehicle is propelled over a relatively steep incline and thereby prevent the lower end of said depending portion from contacting and digging into or scraping against the road surface and prevent damage to the bumper or vehicle or cause the operator to lose control of the vehicle, and retaining means within said depending portion for holding said member for rotation within said opening but sufficiently rigid so that when said member contacts the road surface it lifts the chassis of the vehicle and prevents contact of the depending portion and damage to the bumper and vehicle.

FLORENT E. ROBERT.

REFERENCES CITED

The following references are of record in the file of this patent:

UNITED STATES PATENTS

| Number | Name | Date |
|---|---|---|
| 778,200 | Lev | Dec. 20, 1904 |
| 870,072 | Wilson | Nov. 5, 1907 |
| 1,033,750 | Tift | July 23, 1912 |
| 1,467,640 | Ilich | Sept. 11, 1923 |
| 1,702,027 | Beaver | Feb. 12, 1929 |
| 2,508,836 | Morris | May 23, 1950 |